United States Patent [19]

Luker

[11] Patent Number: 5,063,002
[45] Date of Patent: Nov. 5, 1991

[54] METHOD FOR PRODUCING AN ELASTOMERIC CRUMB USING GAS TO FIRST CUT AN EXTRUDED HOT, STICKY ELASTOMERIC EXTRUDATE MATERIAL, FORM THE CRUMB, AND THEN CONVEY IT AWAY

[75] Inventor: Norman E. Luker, Baton Rouge, La.

[73] Assignee: Exxon Chemical Patents Inc., Linden, N.J.

[21] Appl. No.: 479,837

[22] Filed: Feb. 14, 1990

Related U.S. Application Data

[62] Division of Ser. No. 225,059, Aug. 9, 1988, Pat. No. 4,954,352.

[51] Int. Cl.⁵ .............................................. B29C 9/02
[52] U.S. Cl. ...................................... 264/12; 264/142; 264/500; 425/6; 425/72.1; 425/289
[58] Field of Search ............... 264/500, 142, 504, 555, 264/140, 141, 5, 14, 13, 12; 425/6, 7, 72.1, 289, 296; 83/177

[56] References Cited

U.S. PATENT DOCUMENTS

| | | | |
|---|---|---|---|
| 3,213,170 | 10/1965 | Erdmenger et al. | 264/142 |
| 3,316,590 | 5/1967 | Rettig | 18/12 |
| 3,596,319 | 7/1968 | McKenica | 425/308 |
| 3,669,722 | 6/1972 | Bishop | 117/100 C |
| 3,759,642 | 9/1973 | Poteet | 425/72 |
| 3,874,835 | 4/1975 | Rossiter et al. | 425/306 |
| 3,917,507 | 11/1975 | Skidmore | 159/2 E |
| 3,973,890 | 8/1976 | Porter et al. | 425/144 |
| 4,110,843 | 8/1978 | Skidmore | 366/83 |
| 4,151,251 | 4/1979 | Kropa | 264/557 |
| 4,446,094 | 5/1984 | Rossiter | 264/349 |
| 4,451,414 | 5/1984 | Rossiter | 264/40.5 |
| 4,465,451 | 8/1984 | Adderley, Jr. | 425/145 |
| 4,483,886 | 11/1984 | Kowalski | 427/213 |

FOREIGN PATENT DOCUMENTS 60-127943 7/1985 Japan ........................... 83/177

Primary Examiner—Jan H. Silbaugh
Assistant Examiner—Catherine Timm
Attorney, Agent, or Firm—M. L. Gibbons

[57] ABSTRACT

A method for producing particles of polymeric material by extruding hot, sticky material in a plastic state through orifices in a die plate. The extruded plastic material is cut into crumb upon exit from the orifices by a high velocity gas stream, suitably air, and the particles conveyed away from the die face. The air supply is coupled to a cutting chamber for providing the stream of air across the face of the die plate to cut and convey the crumb away from the orifices. The cutting chamber is arranged to include a restricted throat having an exit area in close proximity to the orifices and a further portion for providing an accumulation zone adjacent the orifices, the accumulation zone having a cross-sectional area which increases from the exit area of the throat to a product discharge zone remote from the orifices in a downstream direction.

3 Claims, 3 Drawing Sheets

METHOD FOR PRODUCING AN ELASTOMERIC CRUMB USING GAS TO FIRST CUT AN EXTRUDED HOT, STICKY ELASTOMERIC EXTRUDATE MATERIAL, FORM THE CRUMB, AND THEN CONVEY IT AWAY

This is a division of application Ser. No. 225,059, filed Aug. 9, 1988, now U.S. Pat. No. 4,954,352.

FIELD OF THE INVENTION

This invention relates to apparatus and methods for producing and treating particles of thermoplastic materials such as butyl rubbers and ethylene-propylene rubbers.

BACKGROUND OF THE INVENTION

In the production of elastomers such as butyl, halobutyl or ethylene-propylene type rubbers (as well as other polymers), it is customary to pelletize the polymeric material by means of extruder-cutter arrangements. One type of such a cutter is generally referred to as a "turbulator". Several versions of such apparatus are described in U.S. patents assigned to Welding Engineers, Inc. (see, e.g. U.S. Pat. No. 4,465,451; 4,451,414; 4,446,094; 4,110,843; 3,917,507; and 3,874,835), as well as in U.S. Pat. No. 3,973,890 granted Aug. 10, 1976 to Porter et al. and U.S. Pat. No. 4,483,886 granted Nov. 20, 1984 to R. C. Kowalski. As is described in the Porter et al. '890 patent, a die plate associated with a polymeric extruder device is cylindrical in shape and is provided with radially extending extrusion orifices through which heat-plasticized material is extruded. A rotary feed screw is provided upstream of the die plate to pressurize the material and cause it to extend from the orifices in the plate. A rotating cutter is provided within the cylindrical opening in close proximity to the face of the die plate and acts to cut the rubber "crumb" as it is extruded. Air or other gas is introduced through the cutter blades within the cylindrical opening to cool, dry and transfer the dried rubber away from the extruder to the next step in the process.

In the Kowalski '886 patent, methods are disclosed for coating pellets of, for example, rubber by mixing coating material in a stream of carrier gas and contacting heated pellets of the rubber with the stream of gas and coating material so as to form a layer of melted coating on the pellets. Kowalski thus discloses techniques for conveying pellets of rubber and other materials in streams of carrier gases.

Additional turbulator apparatus for producing granulated particles is also described, for example, in U.S. Pat. No. 3,316,590—Retig. Cutters for producing pellets of elastomeric material and pneumatic systems for dispersing pelletized material are also disclosed in U.S. Pat. No. 3,669,722—Bishop.

While the foregoing arrangements have been found to be generally satisfactory and, as noted above, a great deal of development work has been done by a number of investigators over a period of years on such apparatus and methods, it has been found that it is necessary to shut down and refurbish the equipment more frequently than is desirable. Furthermore, the apparatus includes components (such as large motors) which are relatively expensive, both in terms of original cost and operating costs. Still further, the rotary cutter arrangements, in the course of severing the crumb from the extrusion die produce more "fines" (small particles) than are desirable.

In addition, the formation at elevated temperature of such polymeric particles can result in those particles adhering to surfaces of the equipment and/or to one another, thereby requiring periodic cleaning and other maintenance.

It is therefore desirable to reduce the complexity, cost and maintenance problems encountered with such prior turbulator equipment and processes.

BRIEF STATEMENT OF THE INVENTION

In accordance with the present invention, the design of pelletizing apparatus suitable for production of thermoplastic material has been simplified dramatically by configuring the air system so that a stream of cutting gas is provided in the vicinity of the extrusion die having velocity and volume characteristics sufficient to cut the rubber crumb without the need for any rotating cutter blades. The entire cutter blade assembly and associated rotating drive system (including a large motor) of prior arrangements are thereby eliminated.

In accordance with the present invention, apparatus for producing particles of elastomeric material for use with an extrusion device including a multi-orifice die plate having a face from which extruded material extends comprises a cutting chamber and a source of air coupled to the cutting chamber. A restricted throat means is interposed between the source of air and the face of the die plate for causing the air to pass across the die plate at a velocity sufficient to sever the extruded material and form crumb particles. A sloping wall member is provided within the cutting chamber and extends from the restricted throat means towards a material discharge region of the chamber for forming a product accumulation region in the vicinity of the orifices, which region has an increasing cross-sectional area proceeding from the throat means towards the ones of the orifices nearest to the discharge region.

In accordance with a further aspect of the present invention, a method of producing particles of elastomeric material comprises extruding polymeric material through a multi-orifice die plate into a chamber, supplying a stream of air into the chamber, restricting the flow of the air into the chamber to a reduced cross-sectional area in the vicinity of the die plate, severing extruded material at the die plate by means of the stream of air to form crumb particles and conveying the crumb particles away from the die plate and the reduced cross-sectional area by the air stream to an enlarged cross-sectional area.

BRIEF DESCRIPTION OF THE DRAWING

The foregoing and further aspects and objects of the present invention will be apparent from the following description and accompanying drawing in which.

DETAILED DESCRIPTION OF THE INVENTION

Figure 1:
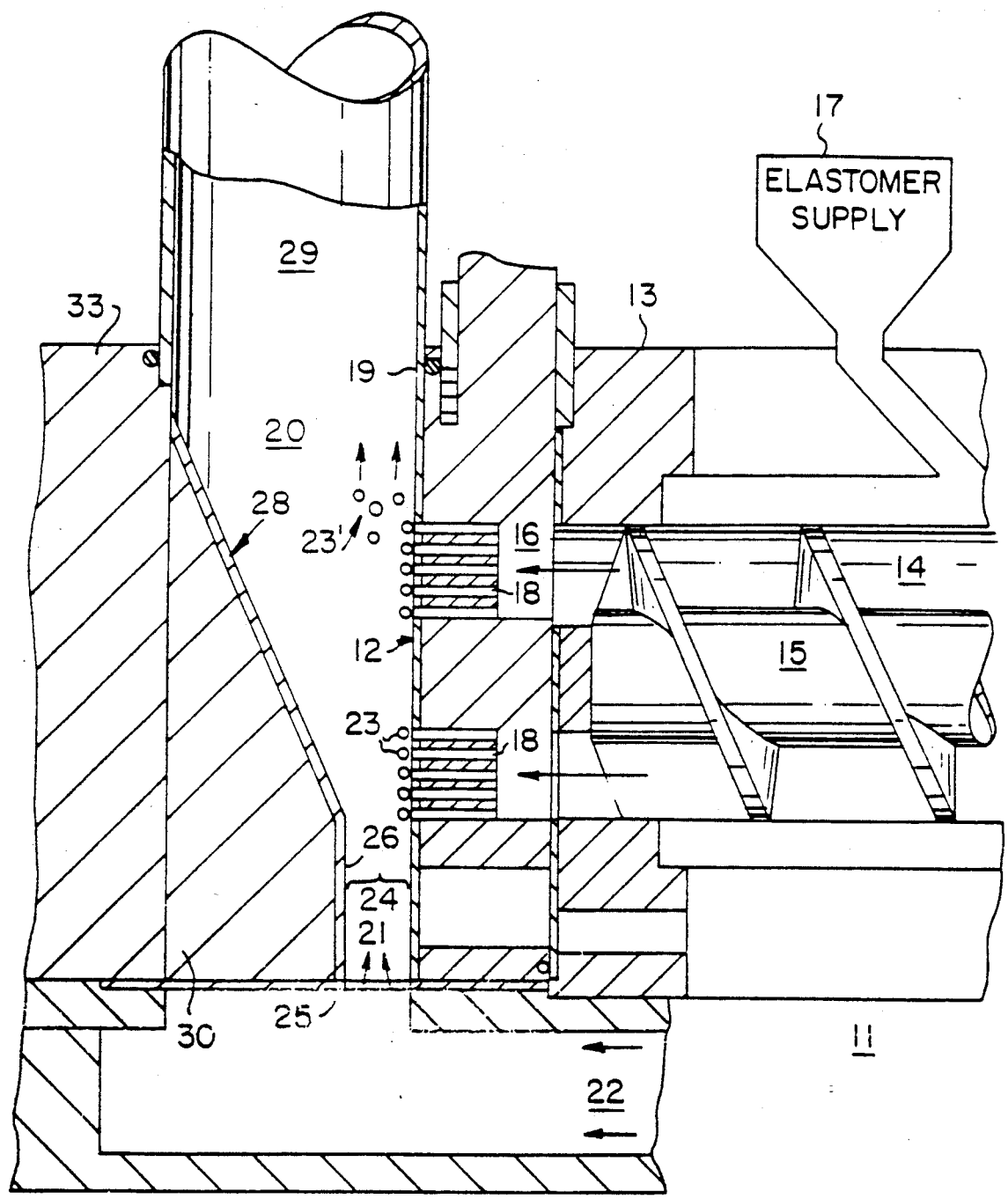
FIG. 1 is a diagram, partially in schematic form and partially in the form of a cross-sectional view, of an extruder and pelletizing apparatus suitable for processing butyl elastomers or the like in accordance with the present invention.

Referring to FIG. 1, an extrusion device, indicated generally by the reference numeral 11, is provided for supplying a heat-plasticized, polymeric material (e.g. rubber) to a multi-orifice die plate 12. The elastomer material is provided from a supply 17 shown schematically as a hopper. The extrusion device 11 comprises an extrusion chamber 13 having a mixing or kneading bore 14 within which a feed screw 15 is mounted. Feed screw 15 is driven by a power source (not shown) such a motor. A pressure chamber 16 is located downstream of the mixing bore 14 and is capped by the die plate 12. Orifices 18 in die plate 12 (ten are illustrated) may lie along a single vertical line or along a number of such lines which are generally parallel to each other. The orifices 18 extend from pressure chamber 16 through a wall 19 of a cutting chamber 20. In the illustrated arrangement (FIG. 1), the main wall of chamber 20 is cylindrical in shape and extends from an air inlet zone 25 below orifices 18 to a material discharge zone 29 above orifices 18.

The cross-sectional portion of the diagram in FIG. 1 is generally to scale to provide an indication of relative dimensions. In the case where the present invention is to be retrofit into a turbulator apparatus of a type marketed by Welding Engineers, Inc. (see patents referred to above) or a similar device, the chamber 20 is of the order of 4.5 inches in diameter and would normally include a rotary cutter as described, for example, in the Porter et al. '890 patent. In the case of the present invention, the need for such a rotary cutter has been eliminated.

That is, heat-plasticized material 23 which is extruded through orifices 18 by the action of feed screw 15 extends into chamber 20 only a short distance (of the order of 0.25 to 1.0 inches) before it is acted upon by a stream of cutting air 21 provided by an air supply 22. Air supply 22 is coupled to the lower end of cutting chamber 20 in an air inlet zone (below orifices 18) by means of a restricted passage or throat 24.

The throat 24 is formed in the cylindrical chamber 20 by means of a throat wall member 26 extending between two lines which lie on the wall of cylindrical chamber 20 and are spaced equidistantly from the line of orifices 18. The portion of the cylindrical wall of chamber 20 lying between the two lines comprises 2 segment of 2 cylinder.

Figure 2:
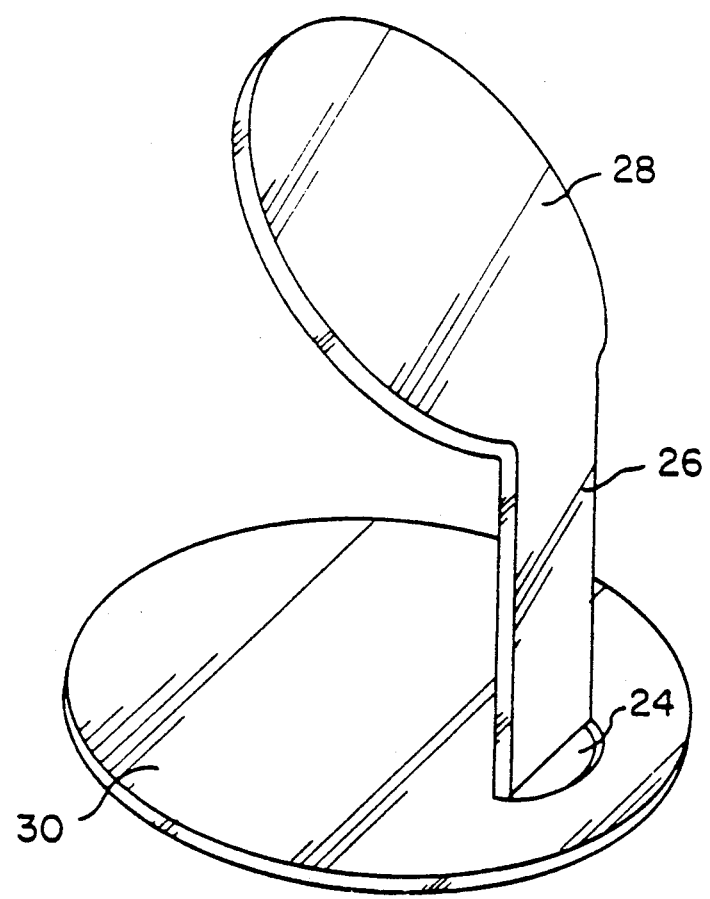
FIG. 2 is an isometric view of one configuration of an insert suitable for placement within a turbulator in place of a rotary cutter to provide apparatus in accordance with the present invention.
Figure 3:
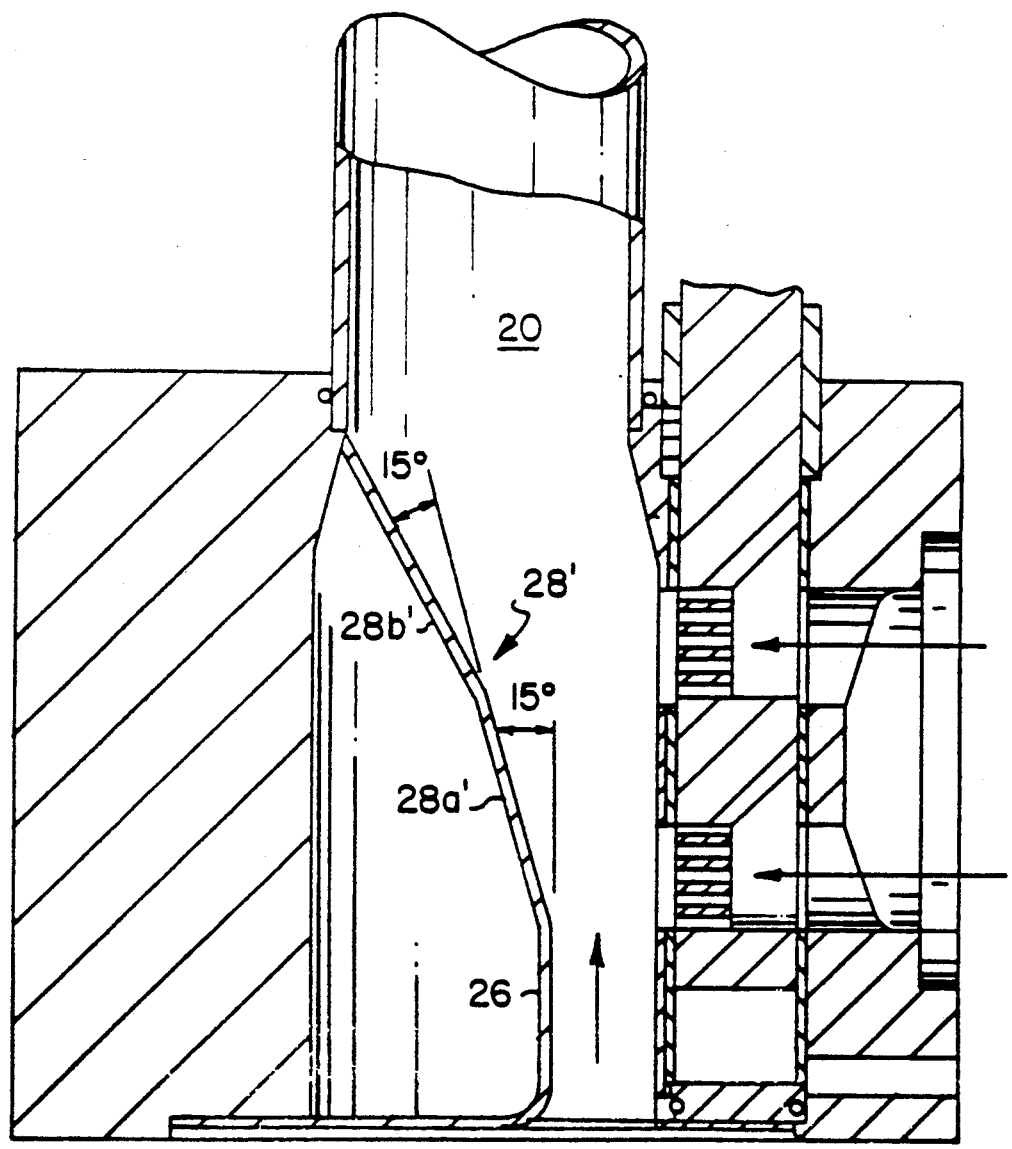
FIG. 3 illustrates an alternative embodiment of the invention.

In an arrangement which has been operated successfully, the wall member 26 was placed so that the center of the chord defined by wall member 26 was between 1.125 and 1.375 inches from the wall 19 (preferably 1.125 inches). Wall member 26 extends in a vertical direction to a height opposite the lowermost one of orifices 18. At that point, the segment-shaped throat 24 formed between wall member 26 and wall 19 ends. A sloping or diverging wall 28, having the shape of a substantial portion of an ellipse, extends from the uppermost end of throat 24 to a point above the uppermost one of orifices 18 to form an accumulator region. The lower end of throat wall member 26 (the air inlet zone) is connected to a circular flange 30 which is substantially at a right angle with respect to the wall member 26. The flange 30 lies in a horizontal plane and is arranged to block the lower end of cylindrical chamber 20 so as to restrict the cutting air to flow only through the throat 24. As is shown in FIG. 2, throat wall member 26, sloping wall 28 and flange 30 may be formed as a unitary structure (for example, of steel or other suitable metal) which readily may be inserted upwardly into chamber 20. The cross-sectional shape of flange portion 30 may be circular as shown in FIGS. 2 and 3 or it may be any other suitable shape for covering or blocking all but the throat 24 at the lower (air inlet) end of chamber 20. Flange portion 30 preferably extends below the housing 33 of the overall assembly. The insert 26, 28, 30 then may be suitably fastened to the underside of housing 33.

Referring again to FIG. 1, the upper or material discharge portion of chamber 20 is coupled in a conventional manner to an airvey system (not shown) to carry separated crumb particles to subsequent material processing stages.

In the operation of the apparatus of FIG. 1, including the insert illustrated in FIG. 2, air supply 22 is arranged to supply air at a nominal rate of 3600 pounds per hour. A preferable range of operation of air supply 22 is of the order of between 3200 and 4000 pounds per hour. It will be recognized by those familiar with this art that the foregoing operating parameters for air supply 22 are substantially the same as those employed in connection with a rotating cutter turbulator arrangement having a 4.5 inch diameter cutting chamber. However, in the case of the present invention, air supply 22 is coupled to restricted throat 24 which has a reduced cross-sectional area (i.e. the throat area is a segment of a circle of 4.5 inches diameter, the segment having an altitude of approximately 1.125 inches). As a result, the velocity of air 21 in the throat 24 and therefore, in the vicinity of the face of die plate 12, is increased significantly as compared to that which is provided in a conventional rotary cutter turbulator (ignoring any effect of the rotation of the cutters).

In testing the apparatus constructed according to this invention, throat velocities of from about 150 feet/second to about 600 feet/second have been found to produce suitable cutting action. It should be noted that the velocity which is most suitable will vary with materials and operating conditions but can be determined by persons of ordinary skill in this art. Furthermore, other gases (such as nitrogen or carbon dioxide) may be utilized in particular cases.

The elastomer (rubber) is supplied at a suitable temperature (for example, 200° F.) from elastomer supply 17 to the upstream end of kneading bore 14. Feed screw 15 is rotated so as to force the elastomer in plastic form suitable for extrusion into pressure chamber 16. The elastomer passes through the orifices 18 and extends into chamber 20 a distance of approximately one quarter to one inch, whereupon the cutting air 21 severs the crumb particles 23'. The resulting crumb particles 23' have an average diameter of one quarter inch and up to a length of one inch and pass freely into chamber 20. Some of the crumb particles 23' will be conveyed directly upwardly through chamber 20 to the airvey system while a portion of those particles 23' will tend to collect in the zone immediately opposite orifices 18. In order to prevent the crumb particles 23' from blocking the throat 24, the sloping wall 28 is provided opposite orifices 18. In this way, as the crumb 23' is cut off at the orifices 18, the crumb 23' is free to move outwardly and upwardly away from the orifices 18 while being blown by the air 21. It should also be noted that the enlarged collecting zone opposite orifices 18 permits water vapor which exists from orifices 18 to be mixed into the air 21 and removed from the extrusion zone. This arrangement facilitates drying of the resulting product. If the crumb 23', after being severed at the face of die plate 12, were restricted to too small a region, there would be a tendency for the tacky crumb particles 23' to stick together and plug the throat 24. The enlarged and gradually sloping collecting and drying zone provided by sloping wall 28 avoids such problems.

Referring now to FIG. 3, an arrangement is shown which is generally similar to that of FIG. 1 with the exception that a compound slope is provided on sloping wall 28' in the arrangement of FIG. 2. In the FIG. 1 arrangement, the wall 28 is disposed at an angle of approximately 25° from the vertical. The sloping wall 28' of FIG. 3 includes a lower wall portion 28a' at an angle of approximately 15° from the vertical and an upper wall portion 28b' at an angle of approximately 30° from the vertical. The transition between the lower wall portion 28a' and the upper wall portion 28b' is illustrated as lying between the upper and lower halves of the array of orifices 18. Since, in this embodiment of the invention, the cross-sectional area of the chamber 20 increases in the vertical direction at a slower rate in the vicinity of the lower orifices 18, as compared to the arrangement of FIG. 1, the velocity of cutting air 21 will decrease less rapidly across the lower half of the die plate 12. This arrangement is shown to illustrate one way in which the throat and accumulation zones may be modified so as to improve the operation of the apparatus for various types of elastomeric products. The embodiment of FIG. 1, for example, has been found to be preferable for chlorobutyl products.

In the case of each of the arrangements disclosed herein, it has been found that a crumb has been produced in which the presence of fines has been reduced as compared to the rotary cutter devices. The operating costs of downstream equipment which is adversely affected by the presence of such fines has therefore been reduced. Use of the present invention (specifically the embodiment of FIG. 1) will reduce the need to scrape downstream crumb conveyers, thereby reducing labor costs as compared to operating costs of a typical turbulator installation. Furthermore, significant additional savings in energy usage, additional equipment maintenance and initial capital expenditures can be realized for a new installation of the present invention as compared to a prior rotary cutter turbulator installation.

While the invention has been described in terms of retrofitting of an insert (FIG. 2) into a standard turbulator configuration, it should be recognized that apparatus according to this invention may be constructed from "the ground up". In that case, the specific geometry of the restricted throat 24 and the sloping wall portion 28 may be the same or may be different than that disclosed herein. For example, the face of the die plate 12 may be flat rather than a portion of a cylinder and the shape of the throat 24 may be other than a segment of a cylinder without departing from the concepts disclosed.

Furthermore, it should be recognized that the geometry of throat 24 may be made variable. That is, the wall of throat 24 may be formed by two overlapping sleeve portions which are adjustable vertically with respect to one another by, for example providing a threaded shaft connected to one sleeve and a mating set of slots in the other sleeve of the type commonly employed in clamping arrangements. Such a variable throat arrangement may be adjusted either manually or by means of a motor. Furthermore, the adjustments may be made based upon operating conditions sensed within the apparatus, such as an undesirable rate of accumulation of crumb in the vicinity of throat 24. Apparatus for adjusting the relative positioning of two sleeves is described, for example in the above-noted patent of Porter et al. It should also be noted that variable die plates of the type disclosed by Porter et al. may also be utilized in connection with the present invention.

While this invention has been described in terms of certain preferred embodiments, it should be recognized that various modifications may be made without departing from the scope of the invention which is set forth in the following claims.

What is claimed is:

1. A method for producing crumb particles of an elastomer comprising:
   extruding a hot, sticky elastomeric mass through orifices in a multi-orifice die plate into a chamber of variable cross-section, which forms a zone of reduced cross-section and a contiguous zone of increased cross-section,
   supplying a stream of gas into the zone of reduced cross-section sufficient to form a high velocity gas stream of 150 to 600 feet per second,
   directing the flowing high velocity gas stream emitted from the zone of reduced cross-section substantially tangentially across the face of the die plate thereby severing the hot, sticky elastomeric material emerging form the orifices to form the crumb particles, while
   said gas stream is conveying said crumb particles away from said die plate into said zone of increased cross-section where the velocity of the gas stream decreases to a level which results in temporary accumulation of a portion of said severed crumb particles in the vicinity of said die plate but away from said zone of reduced cross-sectional area but ultimately resulting in conveying said severed crumb particles through said zone of increased cross-section and out of said chamber.

2. A method according to claim 1 wherein said gas is air.

3. A method according to claim 2 wherein: said zone of increased cross-sectional area is vertically displaced from and above said zone of reduced cross-sectional area.

* * * * *